(12) United States Patent
Niec et al.

(10) Patent No.: US 9,680,532 B2
(45) Date of Patent: Jun. 13, 2017

(54) DOCKING STATION FOR INDUCTIVELY CHARGED PORTABLE ELECTRONIC DEVICE

(71) Applicant: L&P PROPERTY MANAGEMENT COMPANY, South Gate, CA (US)

(72) Inventors: Milosz Zbigniew Niec, Tecumseh (CA); Renato Colja, Windsor (CA); Robert James McMillen, Tecumseh (CA); Xinde Liang, Windsor (CA)

(73) Assignee: L&P Property Management Company, South Gate, CA (US)

( * ) Notice: Subject to any disclaimer, the term of this patent is extended or adjusted under 35 U.S.C. 154(b) by 67 days.

(21) Appl. No.: 14/724,341

(22) Filed: May 28, 2015

(65) Prior Publication Data

US 2015/0270875 A1 Sep. 24, 2015

Related U.S. Application Data

(62) Division of application No. 13/599,605, filed on Aug. 30, 2012, now Pat. No. 9,059,591.

(Continued)

(51) Int. Cl.
*H02J 7/00* (2006.01)
*F21L 4/08* (2006.01)
(Continued)

(52) U.S. Cl.
CPC .......... *H04B 5/0037* (2013.01); *H02J 7/0044* (2013.01); *H02J 7/025* (2013.01);
(Continued)

(58) Field of Classification Search
CPC .. H02J 7/00; H02J 7/0044; H02J 7/025; F21L 4/09; F21L 4/13; F21L 4/08;
(Continued)

(56) References Cited

U.S. PATENT DOCUMENTS 4,379,988 A * 4/1983 Mattatall ................. H02J 7/022
320/108
5,733,674 A * 3/1998 Law ....................... H01M 2/105
320/125

(Continued)

OTHER PUBLICATIONS

Notice of Allowance dated Feb. 17, 2015 in U.S. Appl. No. 13/599,605, 11 pages.

*Primary Examiner* — Phallaka Kik
(74) *Attorney, Agent, or Firm* — Shook, Hardy & Bacon, L.L.P.

(57) ABSTRACT

A docking station that securely holds a portable electronic device in a desired location with respect to a primary power coil for inductive charging of a battery of the portable electronic device is provided. In one embodiment the docking station includes a pair of opposed end stops spaced apart longitudinally along a base and a primary coil of an inductive charging system positioned below the base. The end stops are longitudinally adjustable to properly align a secondary coil of the portable electronic device with a primary coil. A flexible retention wall may be deflected to provide a biasing force on the portable electronic device. Walls of the end stops are generally curved toward each other and provide downward pressure to prevent vertical and horizontal movement. In another embodiment, a retainer clip is movably coupled with and selectively slides along the base to securely hold the portable electronic device.

20 Claims, 10 Drawing Sheets

Related U.S. Application Data (60) Provisional application No. 61/529,093, filed on Aug. 30, 2011.

(51) Int. Cl.
*H01M 10/50* (2006.01)
*H04B 5/00* (2006.01)
*H02J 7/02* (2016.01)
*H04M 1/04* (2006.01)
H01F 27/06 (2006.01)
H02K 7/14 (2006.01)
H01F 21/02 (2006.01)
H01F 21/04 (2006.01)

(52) U.S. Cl.
CPC ............... *H04M 1/04* (2013.01); *H01F 21/02* (2013.01); *H01F 21/04* (2013.01); *H01F 27/06* (2013.01); *H02K 7/14* (2013.01)

(58) Field of Classification Search
CPC ........ H01M 10/50; H04B 5/037; H01F 27/06; H01F 21/02; H01F 21/04; H02K 7/14; H04M 1/04
USPC ........... 320/108, 113, 115; 362/183; 429/120
See application file for complete search history.

(56) References Cited

U.S. PATENT DOCUMENTS

| | | | | |
|---|---|---|---|---|
| 9,059,591 B2* | 6/2015 | Niec | ................... | H02J 7/0044 |
| 2009/0009936 A1* | 1/2009 | Neu | ................... | H04B 1/3877 |
| | | | | 361/679.01 |
| 2009/0051316 A1* | 2/2009 | Park | ................... | H01M 10/46 |
| | | | | 320/113 |
| 2009/0251101 A1* | 10/2009 | Phillips | .............. | A61M 5/14276 |
| | | | | 320/108 |
| 2010/0156343 A1* | 6/2010 | Jung | ................... | H02J 5/005 |
| | | | | 320/108 |
| 2010/0201313 A1* | 8/2010 | Vorenkamp | ............. | H02J 17/00 |
| | | | | 320/108 |
| 2011/0066086 A1* | 3/2011 | Aarestad | .................. | H01P 5/222 |
| | | | | 601/11 |
| 2011/0084657 A1* | 4/2011 | Toya | ..................... | H02J 7/0044 |
| | | | | 320/108 |
| 2011/0127948 A1* | 6/2011 | Lin | ....................... | H02J 7/0044 |
| | | | | 320/107 |
| 2011/0234155 A1 | 9/2011 | Chen et al. | | |
| 2011/0241440 A1* | 10/2011 | Sakoda | ................... | H02J 5/005 |
| | | | | 307/104 |
| 2011/0270025 A1* | 11/2011 | Fridez | ................... | A61F 5/0059 |
| | | | | 600/37 |
| 2011/0275420 A1* | 11/2011 | Tsao | ..................... | A45C 11/00 |
| | | | | 455/572 |
| 2012/0001048 A1* | 1/2012 | Takahashi | ................ | H04M 1/04 |
| | | | | 248/346.03 |
| 2012/0176087 A1* | 7/2012 | Lee | ..................... | H01R 13/6275 |
| | | | | 320/114 |
| 2012/0235636 A1 | 9/2012 | Partovi | | |
| 2013/0106353 A1* | 5/2013 | Foster | ................... | H02J 7/0044 |
| | | | | 320/114 |
| 2013/0335023 A1* | 12/2013 | Radin | ................. | B60L 11/1816 |
| | | | | 320/109 |

* cited by examiner

DOCKING STATION FOR INDUCTIVELY CHARGED PORTABLE ELECTRONIC DEVICE

CROSS-REFERENCE TO RELATED APPLICATIONS

This application claims priority to U.S. Provisional Application No. 61/529,093, filed Aug. 30, 2011, entitled "Docking Station for Inductively Charged Portable Electronic Device," and U.S. Nonprovisional application Ser. No. 13/599,605, filed Aug. 30, 2012, entitled now U.S. Pat. No. 9,059,591, "Docking Station for Inductively Charged Portable Electronic Device," the entire contents of both of which are hereby incorporated by reference.

BACKGROUND

Cell phones or "smart phones" ("phones") have quickly become a modern day necessity. As the capabilities of these phones continue to increase, the prevalence of these phones has also increased. While there are numerous different makes, models, and sizes of phones available today, all of the phones share a common necessity—the need for electrical power. The vast majority of phones obtain their power from rechargeable batteries. Most phones are charged by plugging a wire or cable into a port on the side of the phone. In recent years, an arrangement was devised whereby phones and other portable electronic devices can be passively charged inductively. This omits the need for the user to have to plug a wire into the side of the phone each time they wish to charge their phone.

Inductive charging generally takes the form of a primary coil that receives power from a power source, such as household AC current or, in a mobile environment, an electrical system of an automobile. The primary coil, which can also be called a transmitter coil or a power coil, receives power from the power source and begins to create an alternating electromagnetic field. A secondary or receiving coil is coupled with the battery of the portable device. When the secondary coil is placed adjacent the primary coil, the secondary coil takes power from the electromagnetic field and uses it to charge the battery. This arrangement allows for the transfer of energy wirelessly for a short distance. As such, the user does not have to create a wired connection with their portable electronic device but can simply place their portable electronic device adjacent the primary coil, which could be in a stationary item such as a docking station for charging power. To achieve optimal exchange or transfer of the power from the primary coil to the secondary coil, the orientation between the primary and secondary coil is important. Accordingly, there is a need for a mechanism that will securely hold a phone or other electronic device in a desired orientation with respect to a primary coil during charging applications. The mechanisms disclosed herein provide such an arrangement.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one embodiment, the invention comprises a docking station for securely holding a phone in a desired orientation with respect to a primary coil. The docking station includes a pair of opposed end stops with retention walls. The end stops are oriented such that they face one another and upper portions of the retention walls are bowed towards each other. The end stops are selectively and individually moveable toward and away from each other in a longitudinal orientation to provide for positioning of the phone in a desired orientation. The adjustability also permits the docking station to hold phones and other portable electronic devices of varying sizes. One of the retention walls is preferably flexible and the other retention wall is preferably generally rigid. The flexible retention wall can be deflected away from the opposite retention wall to permit a phone to be placed between the two retention walls. A natural bias of the retention wall then places a force on the phone to push it toward the opposite retention wall to thereby prevent longitudinal or lateral movement of the phone during the charging application. The curved end feature of the retention walls also provides a downward pressure to securely hold the phone against a base of the docking station.

In a second embodiment, the invention is a portable docking station. In this arrangement, the docking station includes a base taking the shape of a housing which contains the primary coil therein. A cable extends from the housing and terminates in a car plug for receipt in a power port of an automobile. A retainer clip or clipping mechanism is slidably coupled with the housing to retain a phone on an upper surface of the housing. The clip mechanism includes an end stop having a retention wall and a pair of flexible retention arms that extend perpendicularly therefrom. Ends of the retention arms are preferably curled towards one another. The arms are flexible such that a phone may be positioned underneath the ends of the retention arms. The curved nature of the retention arms not only provides downward pressure on an upper surface of the phone but also presses the phone toward the end stop. The user can selectively move the clip mechanism along the base to position the phone to align the coils.

These and other aspects of the invention will become apparent to one of ordinary skill in the art upon a reading of the following description, drawings, and the claims.

BRIEF DESCRIPTION OF THE DRAWINGS

The present invention is described in detail below with reference to the attached drawing figures, wherein.

DETAILED DESCRIPTION

Figure 1:
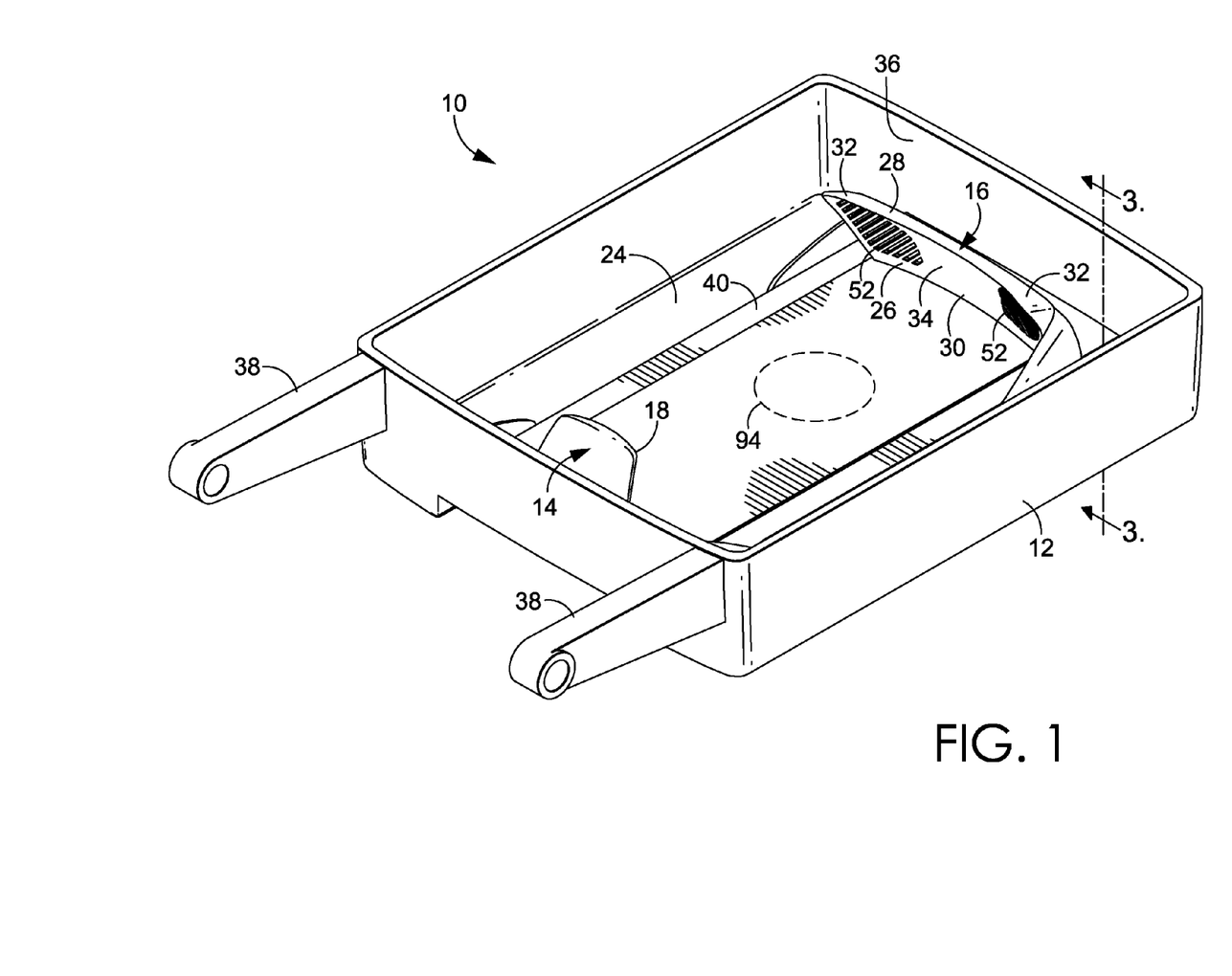
FIG. 1 is a top left perspective view of a docking station for holding a phone during inductive charging in accordance with a first embodiment of the present invention.
Figure 2:
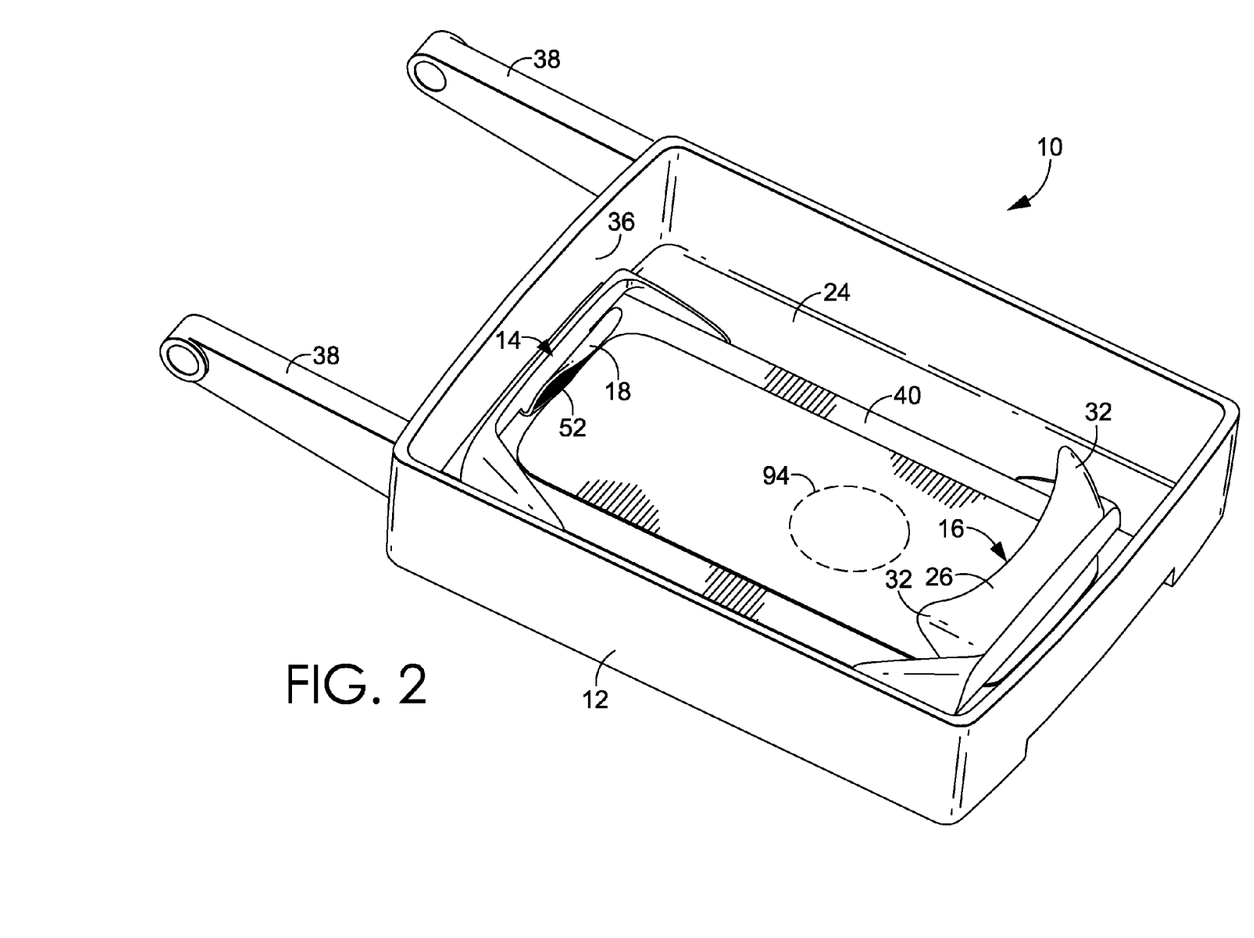
FIG. 2 is top right perspective view of the docking station of FIG. 1.
Figure 3:
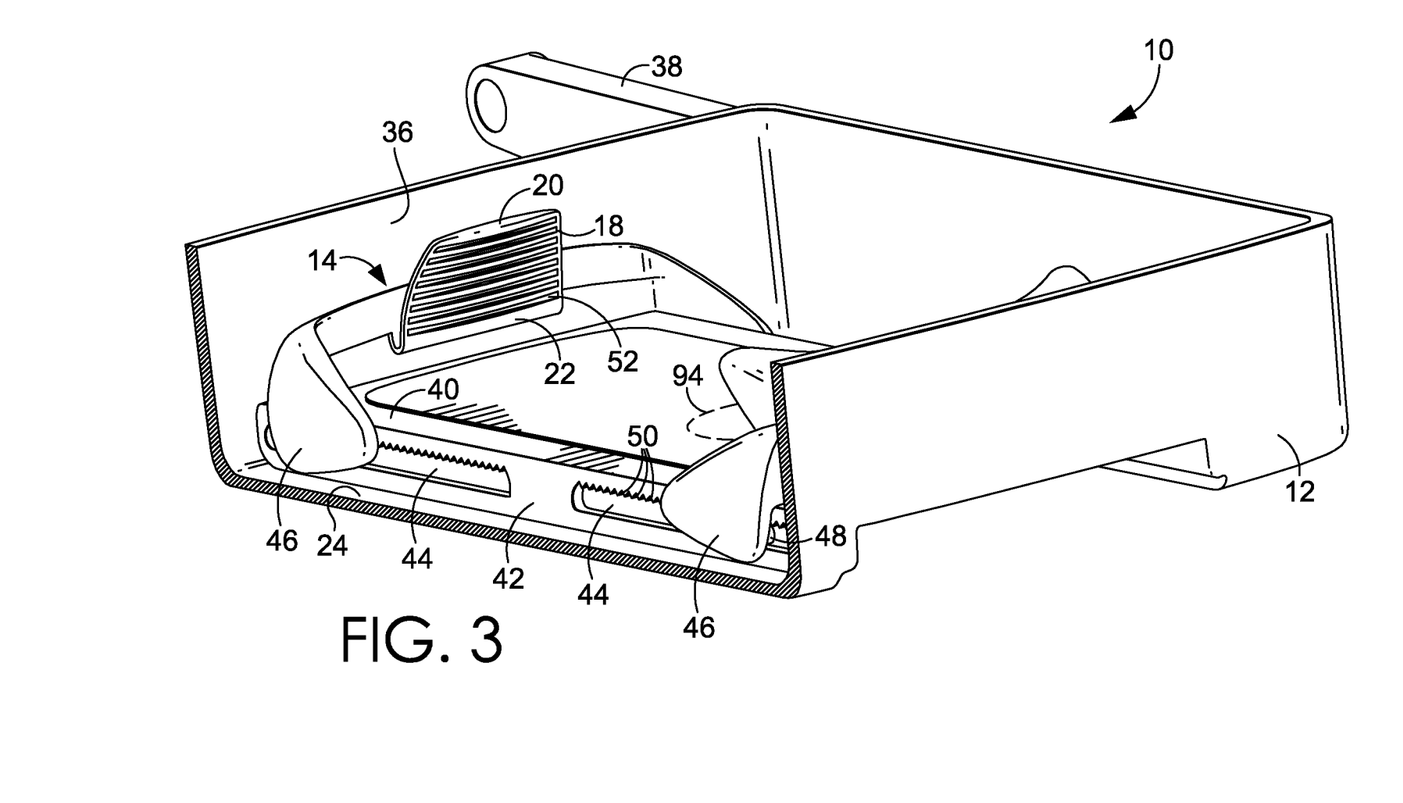
FIG. 3 is a top right perspective view of the docking station of FIG. 1 in partial cross section with a sidewall of a tray removed for clarity in accordance with embodiments of the invention.

Referring now to the drawings in more detail and initially to FIG. 1, number 10 generally designates a docking station for holding a phone or other electronic device in particular abutting orientation with an inductive charger having a primary coil in accordance with a first embodiment of the present invention. In this embodiment, illustrated in FIGS. 1-4, the docking station 10 includes a tray 12 having a pair of opposed end stops 14, 16 that are moveably and selectively coupled therewith. A first of the end stops 14 has a flexible retention wall 18. As best illustrated in FIGS. 2 and 3, the flexible retention wall 18 is curved towards the opposed second end stop 16 such that an upper portion 20 of the flexible retention wall 18 is closer to the second end stop 16 than a lower portion 22 of the flexible retention wall 18 that is adjacent a bottom 24 of the tray 12.

The second end stop 16 includes a preferably generally rigid retention wall 26, the rigid retention wall 26 is also curved inwardly such that an upper portion 28 is closer to the opposed first end stop 14 than a lower portion 30 of the rigid retention wall 26 that is adjacent the bottom 24 of the tray 12. Preferably, the rigid retention wall 26 is also bowed or curved along its length such that outer portions 32 of the rigid retention wall 26 are closer to the opposed first end stop 14 than a central portion 34, for reasons that will be described below.

In this embodiment, the tray 12 has a surrounding sidewall 36 that transitions into the bottom 24. The tray 12 may also have a pair of supports 38 that extend therefrom. The supports can permit pivotal coupling of the tray with a frame (not shown), such as in a center console of an automobile in a flip-up arrangement. The pivoting arrangement permits a user to lift up the tray and pivot it out of the way to gain access to items there below, such as the inductive charger unit with the primary coil.

The bottom 24 of the tray 12 also preferably includes a raised portion 40. The raised portion 40 allows the bottom 24 of the tray 12 to fit around the primary coil of the inductive charger. Additionally, the raised portion 40 also provides a pair of parallel stub walls 42. The stub walls 42 are provided with one or more tracks 44. The tracks 44 may be either external rails (not shown) or may be internal grooves, with which the end stops 14, 16 may be coupled.

In the illustrated embodiment, the end stops 14, 16 include a pair of ears or flanges 46 that extend down on opposite sides of the raised portion 40 of the bottom 24. Projections 48 extend inwardly from the ears 46 and are received in the slots of the track 44. In the illustrated embodiment, where the tracks 44 are slots, the slots can include a plurality of notched teeth 50 which cooperate with the projections 48 to retain the end stops 14 and 16 in desired locations. In that regard, a user may adjust the location of one of the end stops 14, 16, by pinching the ears 46 of the end stop 14 or 16 towards one another to disengage the projections 48 from the teeth 50. The end stop 14 or 16 is then free to move longitudinally along the raised portion 40 of the bottom 24 of the tray 12 to adjust for the length of the phone to be charged and to position the secondary coil of the phone in proper alignment with the primary coil of the induction charger underneath the tray 12.

In use, the user positions their phone on top of the raised portion 40 of the bottom 12 in an orientation such that the secondary coil of the phone is aligned with the primary coil of the inductive charger. The user then adjusts the location of the two end stops 14, 16 so that the flexible retention wall 18 abuts one end of the phone and the rigid retention wall 26 abuts the opposite end of the phone. The location of the end stops 14, 16 can be adjusted so that the phone is held securely in place by the retention walls 18, 26. In that regard, the flexible wall 18 should be compressed slightly so that the flexible wall 18 will be biased towards the phone to exert both a downward force on the phone and a force in the longitudinal direction of the phone toward the second end stop 16.

Figure 4:
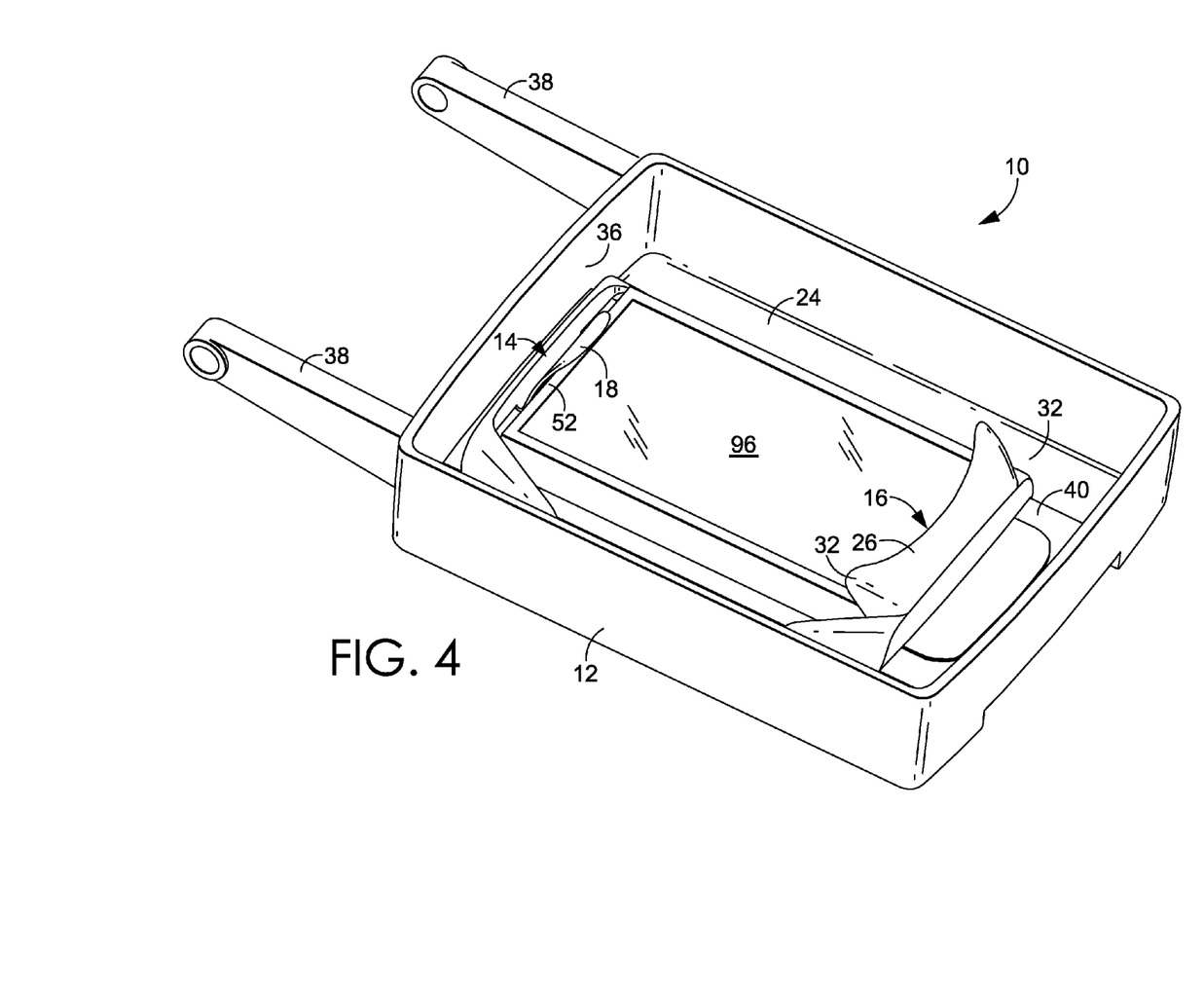
FIG. 4 is a top right perspective view of the docking station of FIG. 1.

The curved nature of the rigid retention wall 26 provides that the rigid retention wall 26 engages the phone in two locations, namely, the upper corners of the phone. This causes the rigid retention wall 26 to not only exert a downward force, to force the phone downwardly into contact with the raised portion 40 of the tray to prevent vertical movement of the phone, but it also cooperates to prevent lateral movement of the phone. As shown in FIG. 4, a phone 96 is held in position by flexible retention wall 18 and rigid retention wall 26, and positioned above a primary coil of an inductive charger such that a secondary coil associated with a battery of the phone 96 is aligned with the primary coil to facilitate inductive charging of the battery. Accordingly, the phone 96 is securely held in a desired orientation with respect to a primary coil. As shown in the embodiment of FIG. 4, the location of end stop 16 has been adjusted on the raised portion 40 to ensure that phone 96 is aligned with the primary coil, to facilitate inductive charging of the battery.

To remove the phone 96 from the docking station 10, the user simply grabs the phone and moves it toward the flexible retention wall 18, thereby compressing the flexible retention wall 18. The flexible retention wall 18 can be compressed an amount sufficient to permit the opposite end of the phone to come out from underneath the inwardly curved outer portions 32 of the rigid retention wall 26, at which point that end may be lifted or pivoted up and the phone can be removed from the docking station 10. Similarly, to then insert the phone 96 in the docking station 10, the user can tilt an end of the phone downwardly and place the lower end into abutting engagement with the flexible retention wall 18. The user can then compress the flexible retention wall 18 with the end of the phone an amount sufficient to permit the other end of the phone to pass by the inwardly curved outer portions 32 of the rigid retention wall 26 as the phone is rotated to a generally horizontal position such that it lies flat on the bottom 24 of the tray 12. When the user releases the phone and thereby removes the compression force, the flexible retention wall 18 decompresses and moves the opposite end into engagement with the rigid retention wall 26. This arrangement provides for and makes possible one handed operation. The phone engaging surfaces of the retention walls 18, 26 may be provided with a soft rubber-like material having a plurality of grooves 52 therein to provide for a soft and pliable phone engaging surface.

Figure 5A:
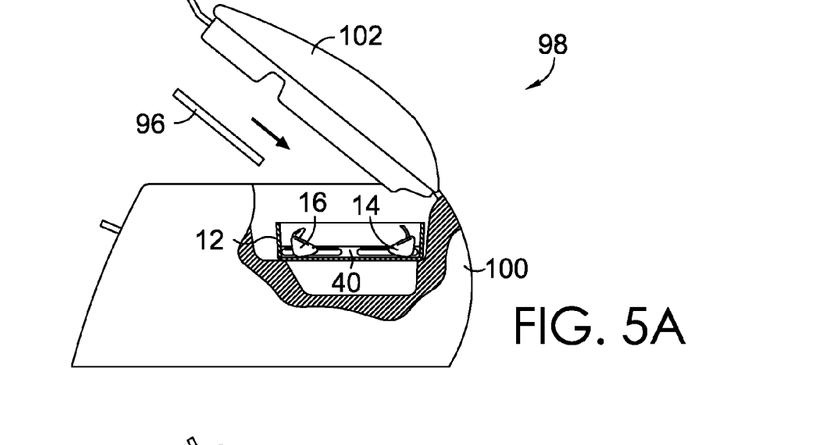
FIGS. 5A-5C are side elevation views in partial cross section with a portion of a sidewall of an armrest console cut-away to reveal the docking station inside the console in accordance with an embodiment of the invention.
Figure 5B:
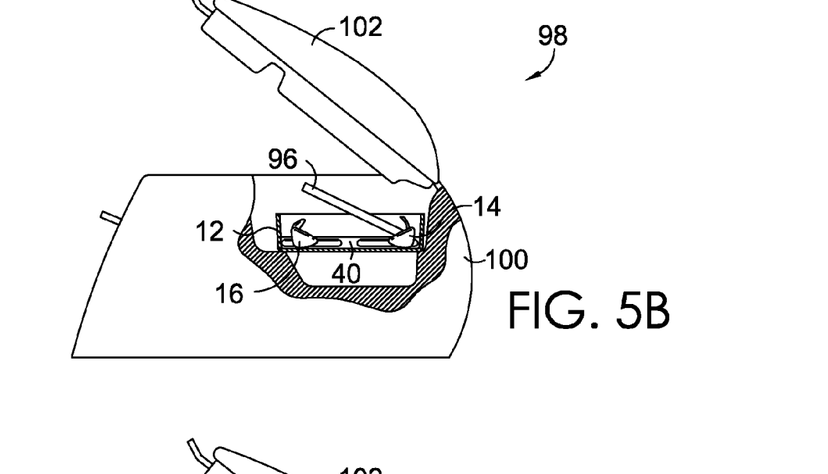
Figure 5C:
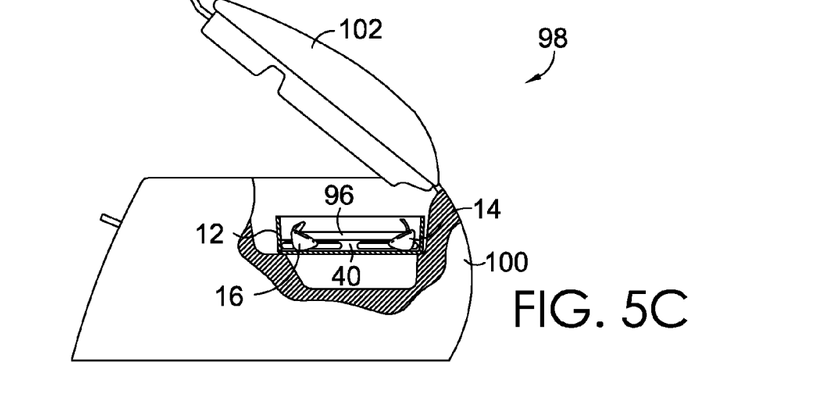
Figure 6:
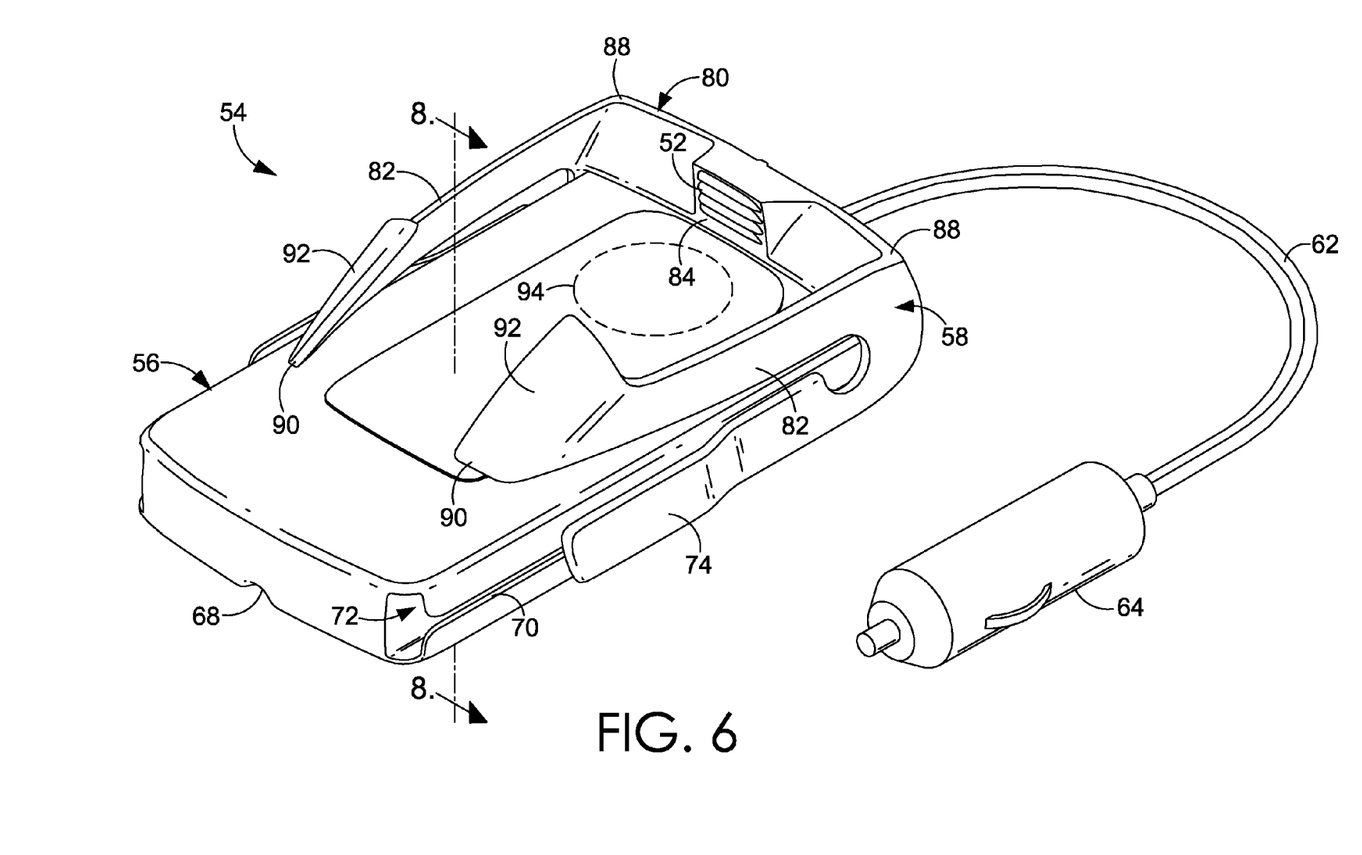
FIG. 6 is a top left perspective view of a second embodiment of the docking station of the present invention.
Figure 7:
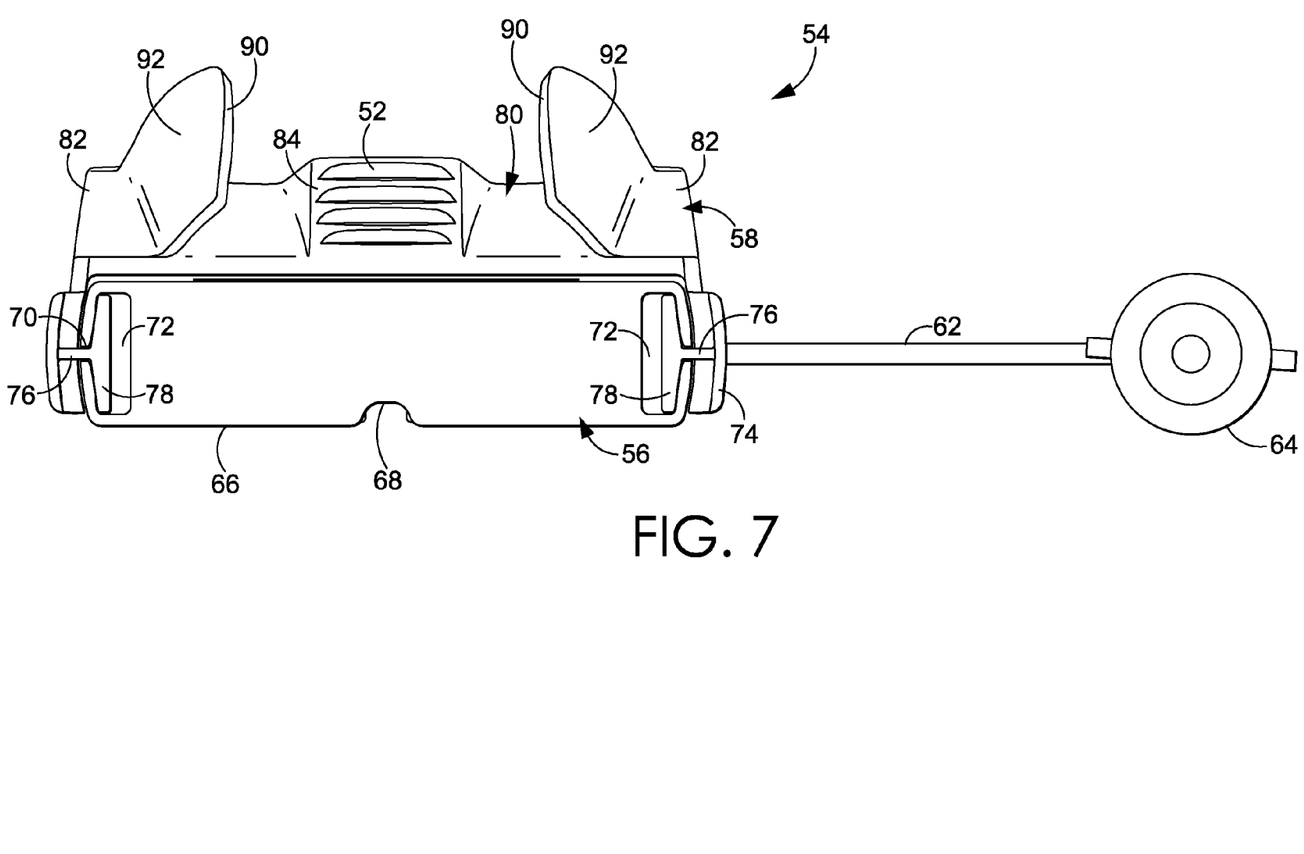
FIG. 7 is a front side elevation view of the docking station of FIG. 6.

Turning now to FIGS. 5A-5C, side views in partial cross section of one embodiment include a tray 12 of a docking station 10 inside an armrest or center console 98. The armrest 98 includes a base 100 and a hinged top 102. However, as will be understood, various embodiments of the invention may be integrated into an armrest or other apparatus with a number of different configurations, bases, and tops. In FIG. 5A, the hinged top 102 is raised to reveal the tray 12, into which a phone 96 is inserted. In FIG. 5B, an end of the phone 96 first contacts end stop 14, which is deflected to allow the insertion of the other end of phone 96 against the opposing end stop 16. As shown in FIG. 5C, the phone 96 is positioned on raised portion 40 against both end stops 14 and 16, and as discussed above, positioned with respect to primary coil for inductive charging of the phone 96.

Figure 8:
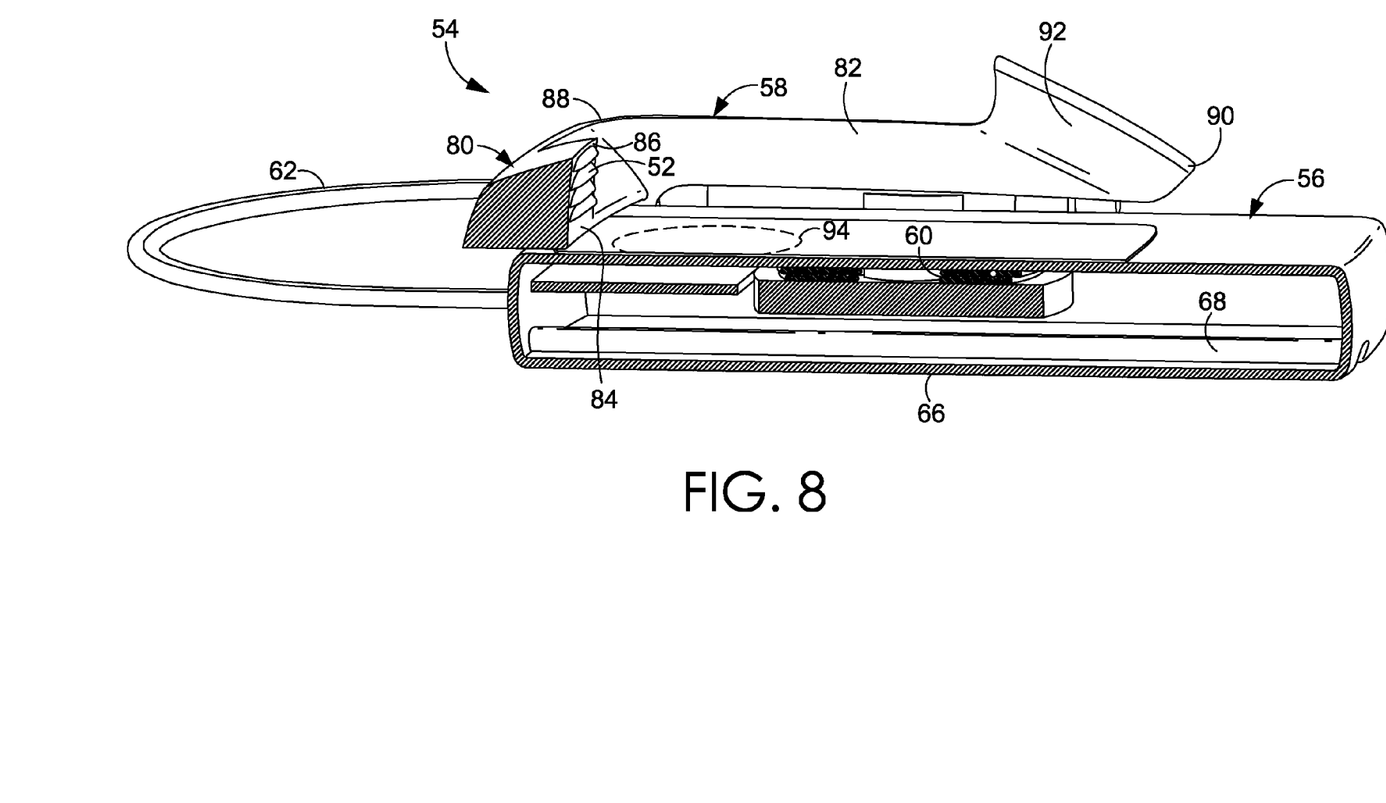
FIG. 8 is a top side perspective view in partial cross section to remove a sidewall of the docking station of FIG. 6.

Referring next to FIGS. 6-9, a second embodiment of the docking station of the present invention is disclosed. In this embodiment, the docking station 10 takes the form of a portable induction charging station 54. The charging station 54 includes a base housing 56 with a retainer clip or clipping mechanism 58 selectively coupled thereto. The base housing 56, as best in illustrated in FIG. 8, is preferably a hollow case-like device which encloses the electronics and components for the induction charger, including, the primary coil 60. A wire 62 extends from the base housing 56 and terminates in a car charging plug 64. The car charging plug is designed for receipt in a power outlet socket or port of an automobile or other vehicle, as readily understood in the art. A bottom surface 66 of the base housing 56 may include a longitudinal channel 68 therein for receiving the wire 62 in the event that the user must orient the charging station such that the wire 62 comes out of the opposite end of the base housing 56.

The base housing 56 also includes a pair of tracks 70 on opposite sides of the base housing 56. The tracks 70 may take the form of rails (not shown) or slots 72 that facilitate coupling of the retainer clip 58 with the base housing 56. In that regard, the retainer clip 58 includes a pair of lower arms 74 that extend longitudinally along the sides of the base housing 56. The lower arms include projections 76 with flanges 78 that ride in the slots 72 of the tracks 70 of the base housing 56. This arrangement permits the retainer clip 58 to slide along the base housing 56 to adjust the location where the phone is positioned for charging. Similarly, as the slots 72 run the entire length of the base housing 56, the retainer clip 58 can be removed, rotated 180°, and re-coupled with the base housing 56 to provide an even wider range of adjustments.

The retainer clip 58 includes a first end stop 80 and a pair of flexible extension arms 82. The first end stop 80 includes a retention wall 84, as best illustrated in FIG. 8. The retention wall 84 is preferably bowed or curved inwardly towards an upper portion 86 thereof. As discussed above, the inwardly curved or bowed nature of the end stop helps to force the phone downwardly onto the surface upon which it rests and helps to prevent vertical movement of the phone away from the primary coil 60 during the charging process. The retention wall 84 may also include a plurality of grooves 52 as discussed above.

Figure 9:
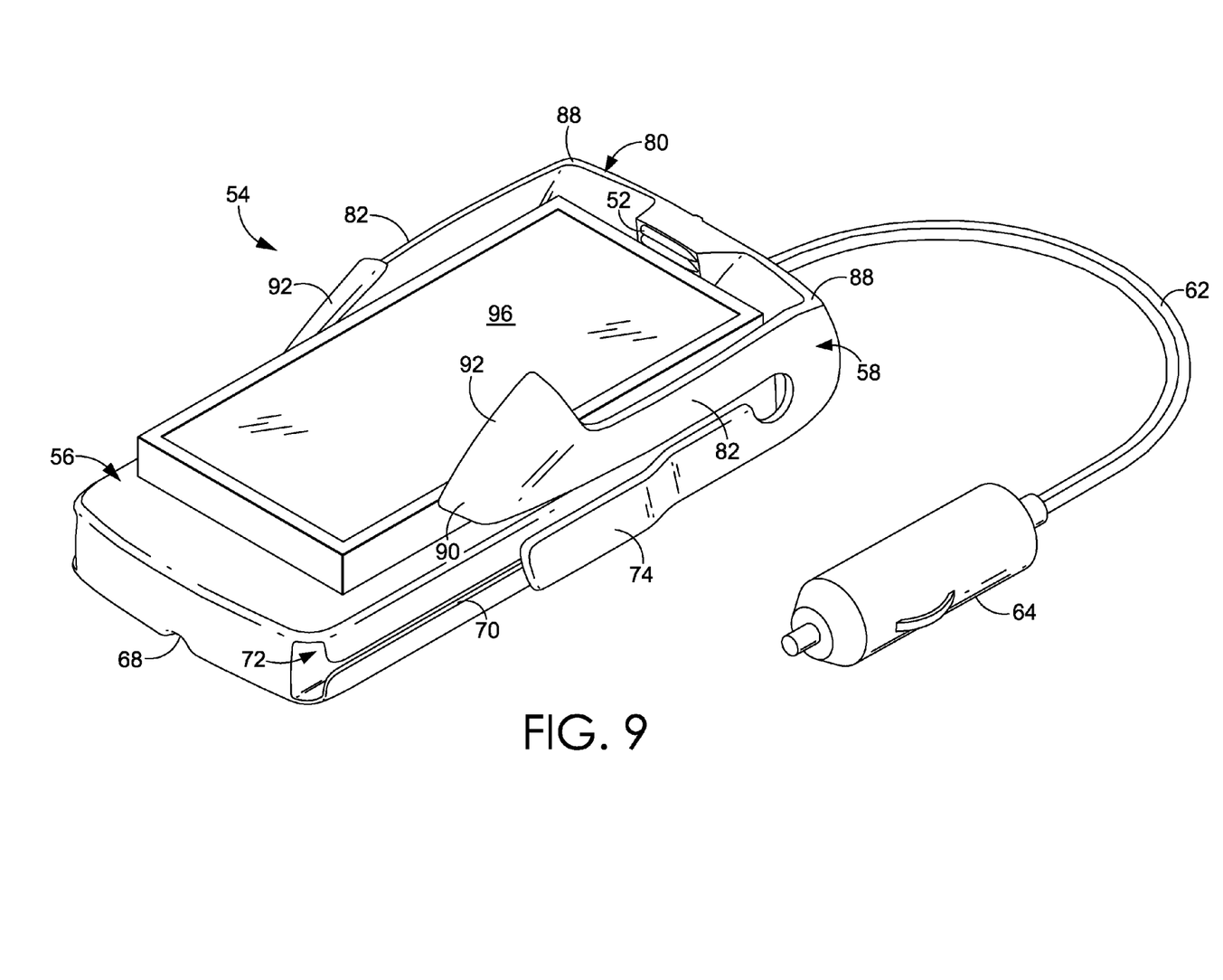
FIG. 9 is a top left perspective view of the second embodiment of the docking station of the present invention with the clipping mechanism moved along the base housing and holding a phone.

The flexible arms 82 preferably extend outwardly away from lateral edges 88 of the first end stop 80 in a generally parallel orientation in a longitudinal direction. Distal ends 90 of the flexible extension arms 82 terminate in hold down portions 92. In the illustrated embodiment, the hold down portions 92 represent areas where the distal ends 90 of the flexible extension arms 82 are curved both inwardly and downwardly. As such, when a user slides their phone into engagement with the retainer clip 58 by placing an end of the phone under the hold down portions 92 from the opening adjacent the first end stop 80, the flexible extension arms 82 are deflected both outwardly and upwardly by the thickness of the housing of the phone. As depicted in the example of FIG. 9, this outwardly and upwardly deflection causes the flexible extension arms 82 to exert both downward pressure on the phone 96 as well as longitudinal pressure on the phone 96 in a direction causing it to abut the retention wall 84. The retainer clip 58 may be a single unitary piece formed of a molded plastic. Indicia 94 may be placed on the upper surface of the base housing 56 and/or the raised portion 40 to identify the location of the primary coil and/or to facilitate alignment of the secondary coil with the primary coil.

Figure 10:
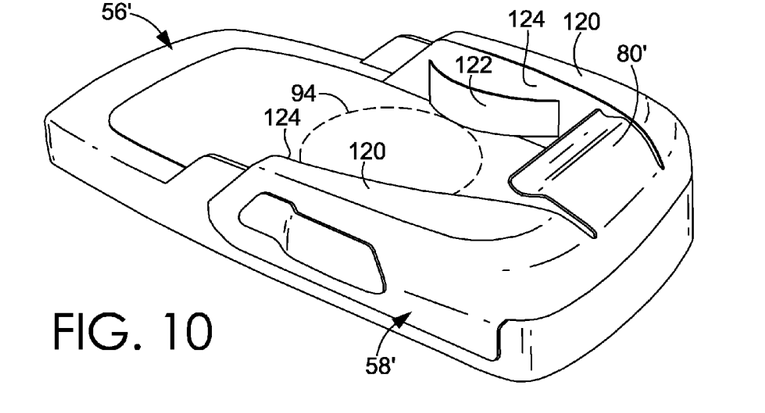
FIG. 10 is a top right perspective view of a third embodiment of the docking station of the present invention.
Figure 11:
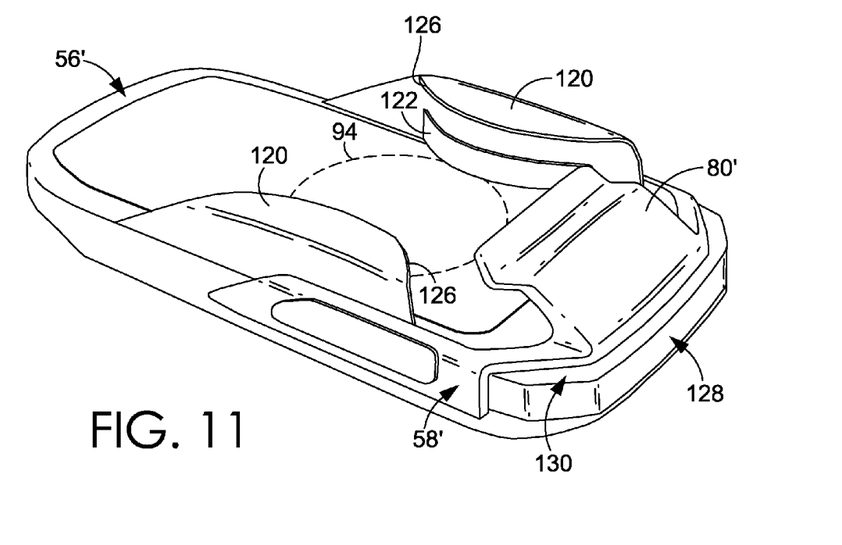
FIG. 11 is a top right perspective view of a fourth embodiment of the docking station of the present invention.

The docking stations in FIGS. 10 and 11 perform the same function as the docking stations discussed above (i.e., namely, holding a phone or other electronic device in a desired relationship with a primary coil of an inductive charging device), but do so in a different manner. Whereas the first two embodiments discussed above hold the phone on both ends, the docking stations of the third and fourth embodiments hold the phone on one end and on both sides. In that regard, the docking stations of the third and fourth embodiments both have a base housing 56' and a retainer clip 58', similar to the second embodiment discussed above. However, the retainer clip 58' not only has a first end stop 80', but it has a pair of opposed side wings 120 that bow inwardly and curve over the top of the base housing 56'. Although the contour 124 of side wings 120 in FIG. 10 is distinct from the contour 126 of the side wings 120 in FIG. 11, both the third and fourth embodiments utilize the side wings 120 to secure the sides of a phone. Accordingly, the side wings 120 each have a spring arm 122 that extends laterally out from the side wings 120 and out over the base housing 56'. The spring arms 122 are compressible by the sides of the phone when it is pushed or slid into engagement with first end stop 80'. The spring arms 122 are biased to their rest positions depicted in FIGS. 10 and 11. Accordingly, the deflection of the spring arms 122 causes them to exert lateral forces on the sides of the phone to securely hold it in place.

The retainer clips 58' can slide along the base housing 56' to provide for adjustability. For example, the retainer clip 58' in FIG. 11 is slid away from a first end 128 of the base housing 56' to reveal a top portion 130 of the base housing 56'. Accordingly, in order to position a phone over indicia 94, retainer clip 58' may be slid along the base housing 56' so that first end stop 80' (with side wings 120) changes the position of the phone with respect to the indicia 94.

It should be noted that while the term "phone" has been used herein, the present invention is not limited to use with cellular phones. The present invention can be used with a wide variety of portable electronic devices including, but not limited to, cellular phones, PDA's, laptop or tablet computers, CD players, video game players or other handheld game consoles, GPS units, MP3 or other music players, etc. Accordingly, use of the term "phone" herein is not in a limiting sense, but can be any portable electronic device.

Many variations can be made to the illustrated embodiments of the present invention without departing from the scope of the present invention. Such modifications are within the scope of the present invention. Other modifications would be within the scope of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the method and apparatus. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A docking station for securely holding a portable electronic device in a desired location above a primary coil of an inductive charger such that a secondary coil associated with a battery of the portable electronic device is aligned with the primary coil to facilitate inductive charging of the battery, the docking station comprising:
a first end stop having a flexible retention wall;
a second end stop opposite the first end stop and spaced longitudinally therefrom, wherein the second end stop has a generally rigid retention wall, wherein a portion of the flexible retention wall is bowed toward the second end stop and wherein a portion of the generally rigid retention wall is bowed toward the first end stop, whereby upper portions of the opposed walls are closer to each other than lower portion of the opposed walls; and
a means for adjusting a distance between the first and second end stops.

2. The docking station of claim 1, wherein at least a portion of the flexible retention wall comprises a plurality of grooves to provide a surface for engaging the portable electronic device.

3. The docking station of claim 1, wherein at least a portion of the generally rigid retention wall comprises a plurality of grooves to provide a surface for engaging the portable electronic device.

4. The docking station of claim 1, wherein the means for adjusting is operable to position the walls at locations where the upper portions of the opposed walls are spaced apart a distance that is less than a length dimension of the portable electronic device to be charged, wherein the flexible retention wall may be flexed away from the second stop by a longitudinal force applied to the flexible retention wall by a user via a first end of a portable electronic device a distance large enough to permit a second opposite end of the portable electronic device to pass by the upper portion of the generally rigid retention wall, and wherein flexing of the flexible retention wall away from the second stop results in a biasing longitudinal force in the direction of the second end stop.

5. The docking station of claim 1, wherein the generally rigid retention wall of the second stop is curved toward the first stop such that outer portions of the generally rigid retention wall are longitudinally closer to the first end stop than a central portion of the generally rigid retention wall.

6. A docking station for charging a rechargeable device, the docking station comprising:
a tray having one or more tray sidewalls and a tray bottom, wherein the tray encloses a raised portion configured to extend from the tray bottom, the raised portion comprising:
(1) a first end stop having a flexible retention wall, wherein the flexible retention wall is curved towards an opposed second end stop, wherein an upper portion of the flexible retention wall is closer to the second end stop than a lower portion of the flexible retention wall;
(2) the second end stop is spaced longitudinally from the first end stop, wherein the second end stop has a generally rigid retention wall that is curved inwardly, wherein an upper portion of the rigid retention wall is closer to the first end stop than a lower portion of the rigid retention wall; and
(3) a pair of parallel stub walls.

7. The docking station of claim 6, wherein the pair of stub walls further comprise one or more tracks coupled to the first and second end stops.

8. The docking station of claim 7, wherein the one or more tracks comprise external rails.

9. The docking station of claim 7, wherein the one or more tracks comprise internal grooves.

10. The docking station of claim 6, wherein the first end stop further comprises a first pair of flanges and the second end stop further comprises a second pair of flanges.

11. The docking station of claim 10, wherein the second pair of flanges of the second end stop are curved toward the first end stop such that outer portions of the second pair of flanges are longitudinally closer to the first end stop than a central portion of the generally rigid retention wall.

12. The docking station of claim 10, wherein a portion of the first pair of flanges of the first end stop are bowed toward the second end stop and wherein the second pair of flanges of the second pair of flanges of the second end stop are bowed toward the first end stop.

13. The docking station of claim 6, wherein at least a portion of the flexible retention wall comprises a plurality of grooves to provide a surface for engaging the rechargeable device.

14. The docking station of claim 13, wherein the docking station further comprising a tray for enclosing the first end stop and the second end stop.

15. The docking station of claim 14, wherein the tray comprises a bottom portion and at least one side wall that continuously transitions from the bottom portion.

16. The docking station of claim 13, wherein the first end stop comprises a flexible retention wall and the second end stop comprises a generally rigid retention wall.

17. The docking station of claim 6, wherein at least a portion of the generally rigid retention wall comprises a plurality of grooves to provide a surface for engaging the rechargeable device.

18. The docking station of claim 6 further comprising a primary coil underneath the tray bottom for inductively charging the electronic device when the primary coil and a secondary coil in the electronic device are aligned.

19. A docking station for positioning an electronic device during inductive charging, the docking station comprising:
a first end stop;
a second end stop opposite the first end stop and spaced longitudinally therefrom, wherein an upper portion of the first end stop is bowed toward the second end stop and wherein an upper portion of the second end stop is bowed toward the first end stop; and
a means for adjusting a distance between the first and second end stops.

20. The docking station of claim 19 further comprising a primary coil for inductively charging the electronic device, wherein the electronic device comprises a secondary coil.

* * * * *